(12) United States Patent
Khosravi et al.

(10) Patent No.: US 10,649,911 B2
(45) Date of Patent: May 12, 2020

(54) SUPPORTING MEMORY PAGING IN VIRTUALIZED SYSTEMS USING TRUST DOMAINS

(71) Applicant: Intel Corporation, Santa Clara, CA (US)

(72) Inventors: Hormuzd M. Khosravi, Portland, OR (US); Baiju Patel, Portland, OR (US); Ravi Sahita, Portland, OR (US); Barry Huntley, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/940,490

(22) Filed: Mar. 29, 2018

(65) Prior Publication Data

US 2019/0042466 A1 Feb. 7, 2019

(51) Int. Cl.
*G06F 12/1036* (2016.01)
*G06F 12/1009* (2016.01)
*G06F 12/14* (2006.01)
*G06F 12/0891* (2016.01)
*G06F 21/79* (2013.01)
*G06F 21/62* (2013.01)

(52) U.S. Cl.
CPC ...... *G06F 12/1036* (2013.01); *G06F 12/0891* (2013.01); *G06F 12/1009* (2013.01); *G06F 12/1408* (2013.01); *G06F 12/1466* (2013.01); *G06F 21/6281* (2013.01); *G06F 21/79* (2013.01)

(58) Field of Classification Search
CPC ............. G06F 12/1036; G06F 12/0891; G06F 12/1009; G06F 12/1408; G06F 12/1466
See application file for complete search history.

(56) References Cited

U.S. PATENT DOCUMENTS

| 6,986,052 B1* | 1/2006 | Mittal | G06F 12/1441 713/190 |
| 8,799,673 B2* | 8/2014 | Savagaonkar | G06F 12/1441 713/189 |
| 2009/0254572 A1* | 10/2009 | Redlich | G06Q 10/06 |
| 2010/0082865 A1* | 4/2010 | Kirshenbaum | G06F 21/6218 710/113 |
| 2010/0228961 A1* | 9/2010 | Burns | H04L 45/04 713/150 |
| 2014/0297962 A1* | 10/2014 | Rozas | G06F 12/0808 711/135 |

(Continued)

*Primary Examiner* — Ramon A. Mercado
(74) *Attorney, Agent, or Firm* — Lowenstein Sandler LLP

(57) ABSTRACT

Embodiment of this disclosure provide techniques to support full memory paging between different trust domains (TDs) in compute system without losing any of the security properties, such as tamper resistant/detection and confidentiality, on a per TD basis. In one embodiment, a processing device including a memory controller and a memory paging circuit operatively coupled to the memory controller is provided. The memory paging circuit is to evict a memory page associated with a trust domain (TD) executed by the processing device. A binding of the memory page to a first memory location of the TD is removed. A transportable page that includes encrypted contents of the memory page is created. Thereupon, the memory page is provided to a second memory location.

20 Claims, 12 Drawing Sheets

(56) References Cited

U.S. PATENT DOCUMENTS

| | | | |
|---|---|---|---|
| 2016/0085692 A1* | 3/2016 | Kwok | G06F 12/1408 |
| | | | 713/193 |
| 2016/0117265 A1 | 4/2016 | McKeen et al. | |
| 2017/0063532 A1* | 3/2017 | Bhattacharyya | H04L 9/0637 |
| 2017/0090821 A1* | 3/2017 | Woodward | G06F 3/0623 |
| 2017/0185532 A1 | 6/2017 | Durham et al. | |
| 2018/0046823 A1 | 2/2018 | Durham et al. | |
| 2018/0373646 A1* | 12/2018 | Shwartz | G06F 12/128 |
| 2019/0042466 A1* | 2/2019 | Khosravi | G06F 12/1036 |

* cited by examiner

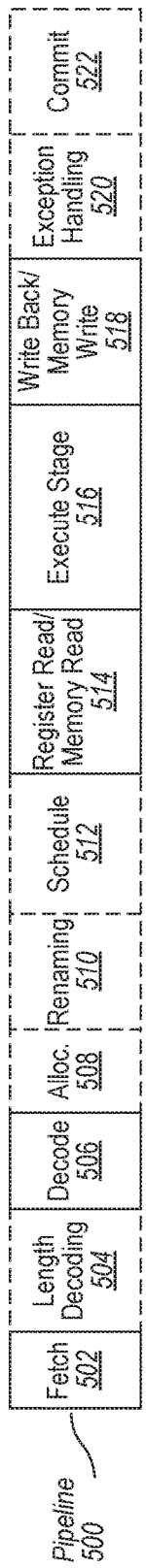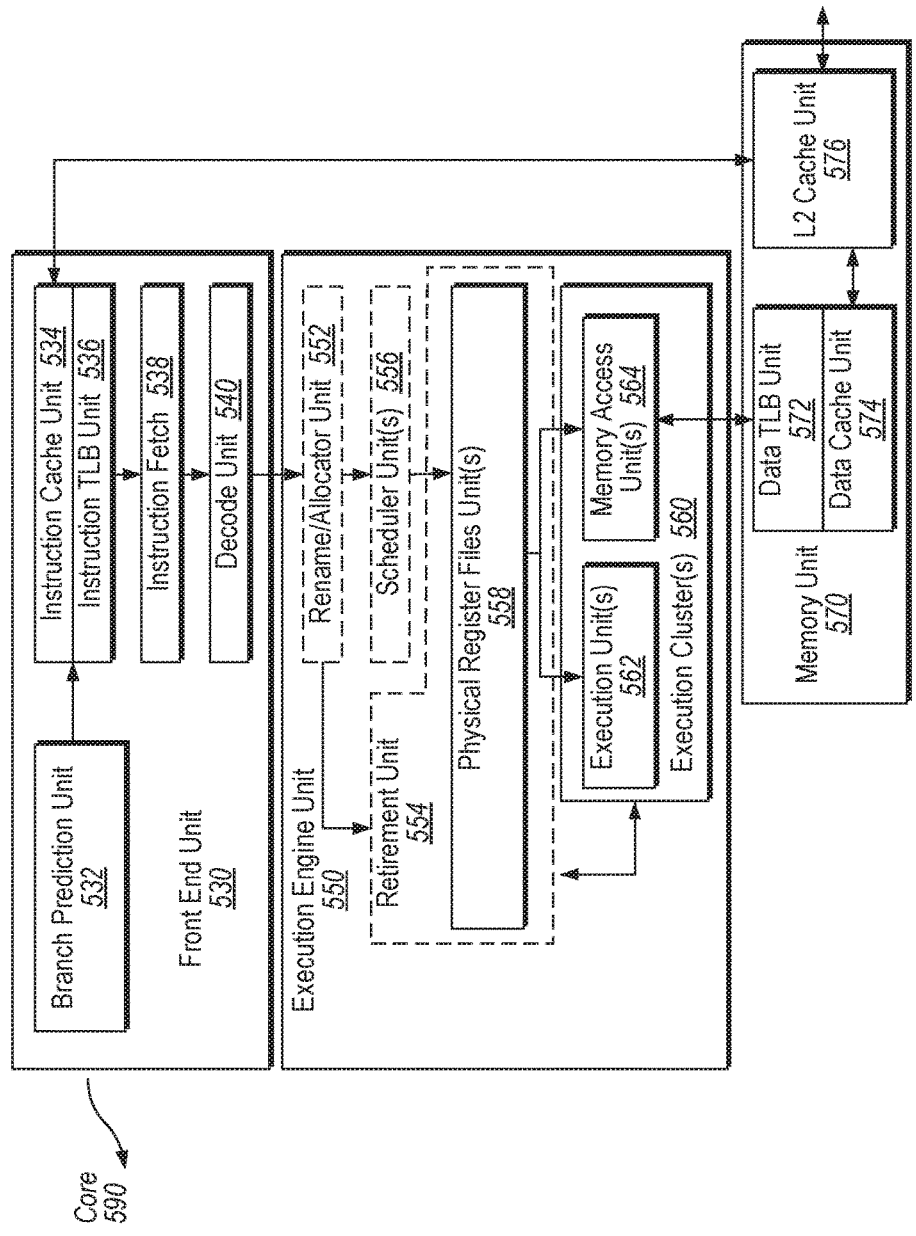

SUPPORTING MEMORY PAGING IN VIRTUALIZED SYSTEMS USING TRUST DOMAINS

TECHNICAL FIELD

Embodiments of the disclosure relate generally to computer systems, and more specifically, but without limitation, to supporting memory paging in virtualized systems using trust domains.

BACKGROUND

Modern processing devices employ disk encryption to protect data at rest. However, data in memory is in plaintext and vulnerable to attacks. Attackers can use a variety of techniques including software and hardware-based bus scanning, memory scanning, hardware probing etc. to retrieve data from memory. This data from memory could include sensitive data for example, privacy-sensitive data, IP-sensitive data, and also keys used for file encryption or communication. The exposure of data is further exacerbated with the current trend of moving data and enterprise workloads into the cloud utilizing virtualization-based hosting services provided by cloud service providers.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5A is a block diagram illustrating a micro-architecture for a processor according to one embodiment.

FIG. 5B is a block diagram illustrating an in-order pipeline and a register renaming stage, out-of-order issue/execution pipeline according to one embodiment.

DETAILED DESCRIPTION

Figure 1:
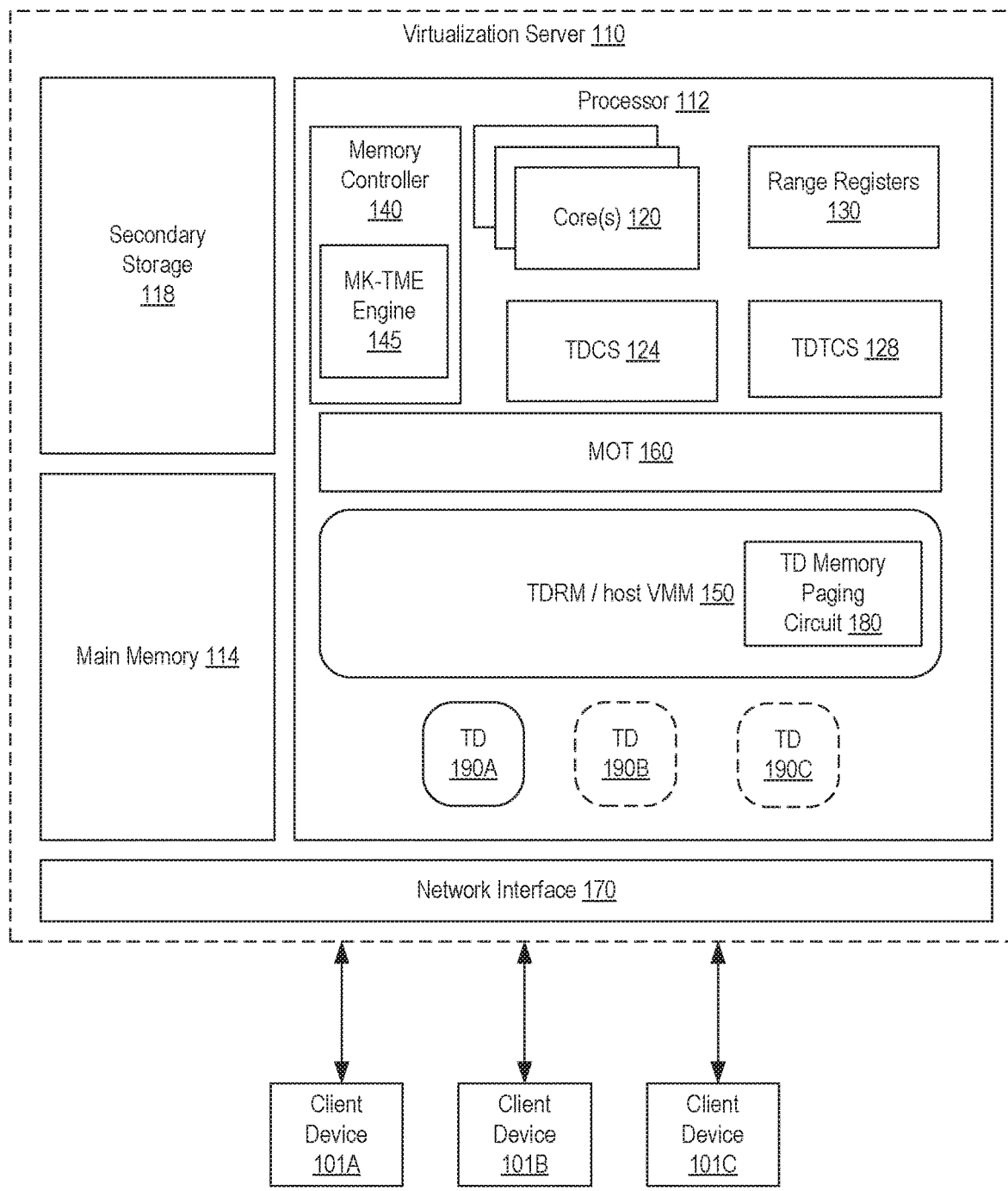
FIG. 1 illustrates a block diagram of a processing system to support memory paging in virtualized systems using trust domains according to one embodiment.

Systems and methods for supporting memory paging in virtualized systems using trust domains are provided. A current trend in computing is the placement of data and enterprise workloads (e.g., tasks to be performed by one or more applications) in the cloud by utilizing hosting services provided by cloud service providers (CSPs). As a result of the hosting of the data and enterprise workloads in the cloud, customers (also referred to as tenants herein) of the CSPs are requesting better security and isolation solutions for their workloads. In particular, customers are seeking out solutions that enable the operation of CSP-provided software outside of a Trusted Computing Base (TCB) of the tenant's software. The TCB of a system refers to a set of hardware, firmware, and/or software components that have an ability to influence the trust for the overall operation of the system.

A trust domain (TD) architecture implemented as an instruction set architecture (ISA) extensions (referred to herein as TD extensions (TDX)) provide confidentiality (and integrity) for customer software executing in an untrusted CSP infrastructure. The TD architecture, which can be a System-on-Chip (SoC) capability, provides isolation between workloads (e.g., execution of applications) of the CSP tenants. Components of the TD architecture can include, but not limited to, memory encryption via a MK-Total Memory Encryption (MK-TME) engine, a resource management capability referred to herein as the trust domain resource manager (TDRM) (e.g., a TDRM may be a software extension of the Virtual Machine Monitor (VMM)), and execution state and memory isolation capabilities in the processor provided via a CPU-managed Memory Ownership Table (MOT) and via CPU access-controlled TD control structures. The TD architecture provides an ability of the processor to deploy TDs that leverage the MK-TME engine, the MOT, and the access-controlled TD control structures for secure operation of TD workloads.

Using the TD architecture, the CSP tenant's software can be executed in a trust domain TD. A TD (also referred to as a tenant TD) refers to a cryptographically protected execution environment that support a CSP tenant's workload. For example, the TD can comprise an operating system (OS) along with applications running on top of the OS, or a virtual machine (VM) running on top of a virtual machine manager (VMM) along with other applications. Each TD operates independently of other TDs in the system and uses logical processor(s), memory, and I/O assigned by the TDRM on the platform. For example, the TDRM in the TD architecture acts as a host for the TDs and has full control of the cores and other platform hardware. A TDRM assigns software in a TD with logical processor(s). The TDRM, however, cannot access a TD's execution state on the assigned logical processor(s). Similarly, a TDRM assigns physical memory and I/O resources to the TDs, but is not privy to access the memory state of a TD due to the use of separate encryption keys enforced by the CPUs per TD, and other integrity and replay controls on memory.

Each TD is cryptographically isolated in memory using at least one exclusive (e.g., TD specific) encryption key of the MK-TME engine for encrypting the memory (holding code and/or data) associated with the trust domain. The processor may utilize the MK-TME engine to encrypt (and decrypt) memory used during execution of the TD workloads. With the MK-TME engine, any memory accesses by software executing within the TD on the processor can be encrypted in memory. For example, the MK-TME engine may be used by the TD architecture to implement one or more keys per each TD/tenant (in which each TD is running a tenant's workload) to achieve a cryptographic isolation between different tenant workloads.

The MK-TME engine may enforce that any memory pages of a particular TD should to be encrypted using a TD-specific encryption key. The TD may further choose specific TD memory pages to be plain text or encrypted using a combination of keys (e.g., ephemeral keys that are generated for each execution of the TD) that are unknown to the TDRM, and a binding ("tweak") operation. The binding operation binds the TD memory pages to a particular TD by using a host physical address (HPA) of the page as a parameter to an encryption algorithm (e.g., a type of AES-XTS Encryption Algorithm with 128 bit encryption key and 128 bit tweak key), which is utilized to encrypt the TD memory page. Thus, if the TD memory page is moved to another location (e.g., in memory or external storage), the page cannot be decrypted correctly even if the TD-specific encryption key is used.

There are, however, several issues that can occur due to the binding of memory pages to specific TDs. For example, memory paging may be used by a host system in a virtualized environment to ensure that the hosted applications (which in this case are implemented as TDs) do not crash due to a lack of memory. With memory paging, the host system software (e.g., VMM/TDRM) may reclaim TD memory pages allocated to a given TD. This may be accomplished by storing contents of the TD memory pages to a disk (e.g., an external hard disk). The freed memory pages can then be allocated to another TD that is in need of extra memory. When the first TD request access to the contents of the reclaimed memory pages, the host system software takes the memory pages from disk and copies them back to any location in memory associated with the first TD. When the first TD tries the decrypt the memory page, it is unable to do so due to a possible new location of the memory pages in memory. This is because the location in which the memory pages are placed back is not fixed. As such, the TD cannot decrypt the memory page correctly if it is in a different physical location in memory. As a result, a tenant application of first TD that uses those TD memory pages may produce unexpected results or even crash, which can adversely affect the service provided by the CSPs to their tenants.

Embodiments of the disclosure address the above-mentioned and other deficiencies by providing transportable pages that can support full memory paging between different TDs in the TD architecture without losing any of its security properties (e.g., tamper resistant/detection and confidentiality on a per TD basis). In one embodiment, the TD architecture may implement instructions that allow the VMM/TDRM to create a transportable page for a target TD memory page bound to a specific TD. This target TD memory page may be associated with memory that is to be freed from the TD. For example, the VMM/TDRM may use the instructions during a memory paging operation to extract or otherwise evict a TD memory page from one TD in order to insert the page into another TD or to move that page to a different physical location in memory.

During a memory paging operation, the VMM/TDRM may use the instructions to first evict the TD memory page from the TD. This eviction unbinds the TD memory page from the TD. To unbind the TD memory page from the TD, the instructions may read the target TD memory page on behalf of the TD. For example, the instruction may instruct the TD to read the target TD memory page which in turn decrypts the page within the TD. The decryption of the TD memory page uses the HPA address of the page and the ephemeral keys of the TD. The VMM/TDRM may issue the instructions for the TD to read a TD memory page in order to extract contents of a TD-assigned volatile memory page from a source memory address to a destination address of the transportable page. This transportable page allows the VMM/TDRM to page out a TD memory page to use for another TD. When the target TD memory page is selected for eviction, the VMM/TDRM then marks the TD memory page (e.g., in a paging table) as unavailable for the TD.

Once the binding of the TD memory page to the TD is removed, the VMM/TDRM can use the instructions to encrypt the extracted content on the transportable page by using the TD-specific encryption key. The transportable page with some metadata is then transported to a different location in memory, or off to a disk or other types of storage devices. For example, the metadata may include integrity value (e.g., cryptographic hash value based on the page contents) that is also stored by the VMM/TDRM in VMM-managed memory. For example, the integrity value can be generated using cryptographic hash algorithm, such as HMAC-SHA256. This integrity value is used to verify that the transportable page has not been tampered with on the storage device. For example, when the transportable page is brought back to be inserted in memory, the VMM/TDRM executes instructions to remove the encryption of the page based on the TD specific encryption key. The instruction then validates the transportable page by comparing the integrity value derived from the transportable page with the integrity value in the VMM-managed memory.

If the integrity value in the VMM-managed memory does not match the integrity value of the transportable page, this indicates that the integrity validation has failed. As a result, the instructions may return an alert notification to the VMM/TDRM of a memory mapping failure associated with the TD. If the integrity value of the transportable page is a match with the integrity value in the VMM-managed memory, this indicates that the transportable page has not been modified. On a successful integrity validation of the transportable page, the VMM/TDRM inserts the page at a specific HPA in memory. The VMM/TDRM then instructs the processor to encrypt the transportable page by using the ephemeral key associated with the TD and the specific HPA location of the page. For example, the VMM/TDRM executes an instruction that passes as a parameter the new location of the transportable page. In some embodiments, this may be a new memory location that is different from where the TD memory page was when it was paged out of TD assigned memory. This encryption binds the transportable page back to the TD at the new memory location. As a result, the binding allows the TD to access the content of the transportable page because the instruction causes the TD to bind the transportable page to TD at the new HPA in memory.

FIG. 1 is a block diagram of a processing system 100 to support memory paging in virtualized systems using trust domains according to one embodiment. In some embodiments, processing system 100 includes a virtualization server 110 that supports a number of client devices 101A-101C. The virtualization server 110 includes at least one processor 112 (also referred to as a processing device) that executes a trust domain resource manager (TDRM) 150. In some embodiments, the TDRM 150 may be included as part virtual machine monitor (VMM) functionality. A VMM (also referred to as hypervisor) may refer to software, firmware, or hardware to create, run, and manage guest applications, such as a virtual machine (VM). In one embodiment, the TDRM 150 may include a VMM that may instantiate one or more trust domains (TDs) 190A-190C (e.g., a software environment to execute a tenant (e.g., customer) workload) accessible by the client devices 101A-101C via a network interface 170. The client devices 101A-101C may include, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device.

In one embodiment, processor 112 implements a TD architecture and ISA extensions (TDX) for the TD architecture. The TD architecture provides isolation between TD workloads 190A-190C and from CSP software (e.g., TDRM 150 and/or a CSP VMM (e.g., root VMM 150)) executing on the processor 112). Components of the TD architecture can include 1) memory encryption via an MK-TME engine 145, 2) a resource management capability referred to herein as the TDRM 150, and 3) execution state and memory isolation capabilities in the processor 112 provided via a MOT 160 and via access-controlled TD control structures (i.e., TDCS 124 and TDTCS 128). The TDX architecture provides an ability of the processor 112 to deploy TDs 190A-190C that leverage the MK-TME engine 145, the MOT 160, and the access-controlled TD control structures (i.e., TDCS 124 and TDTCS 128) for secure operation of TDs 190A-190C.

As shown, the processor 112 may include several components that include, but not limited to, one or more cores 120 (also referred to as processing cores 120), range registers 130 and a memory controller 140. The processor 112 may be used in a processing system 100 that is representative of processing systems based on the PENTIUM III™, PENTIUM 4™ Xeon™, Itanium, XScale™ and/or StrongARM™ microprocessing devices available from Intel Corporation of Santa Clara, Calif., although other systems (including PCs having other microprocessing devices, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the disclosure are not limited to any specific combination of hardware circuitry and software.

In an illustrative example, processing core 120 may have a micro-architecture including processor logic and circuits. Processor cores 120 with different micro-architectures may share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file). The processor core(s) 120 may execute instructions for the processor 112. The instructions may include, but are not limited to, pre-fetch logic to fetch instructions, decode logic to decode the instructions, execution logic to execute instructions and the like. The processor cores 120 include a cache (not shown) to cache instructions and/or data. The cache includes, but is not limited to, a level one, level two, and a last level cache (LLC), or any other configuration of the cache memory within the processor 112.

Processing system 100 also includes a main memory 114 and a secondary storage 118 to store program binaries and other data. Data in the secondary storage 118 may be stored in blocks referred to as pages, and each page may correspond to a set of physical memory addresses. The virtualization server 110 may employ the TDRM/VMM 150 in which applications run by the core(s) 120, such as the TDs 190A-190C, use virtual memory addresses that are mapped to guest physical memory addresses, and guest physical memory addresses are mapped to host/system physical addresses by the memory controller 140. The core 120 may execute the memory controller 140 to load pages from the secondary storage 118 into the main memory 114 (which includes a volatile memory and/or a non-volatile memory) for faster access by software running on the processor 112 (e.g., on the core). When one of the TDs 190A-190C attempts to access a virtual memory address that corresponds to a physical memory address of a page loaded into the main memory 114, the memory controller 140 returns the requested data. The core 120 may execute the VMM portion of TDRM 150 to translate guest virtual addresses to host physical addresses of main memory 114, and provide parameters for a protocol that allows the core 120 to read, walk and interpret these mappings.

In one implementation, a TD 190A may be created and launched by the TDRM 150. The TDRM 150 creates a TD 190A using a certain TD instruction. The TDRM 150 selects a 4 KB aligned region of physical memory and provides this as a parameter to the TD create instruction. This region of memory is used as a TDCS 124 for the TD 190A. When executed, the TD instruction causes the processor 112 to verify that the destination 4 KB page is assigned to the TD (using the MOT 160). The TD instruction further causes the processor 112 to generate an ephemeral memory encryption key and key ID for the TD 190A, and store the key ID in the TDCS 124. As the TDRM 150 assigns physical memory for each TD 190A and 190B, the TD architecture includes a MOT 160. The processor 112 consults the TDRM-managed MOT 160 to assign allocation of memory to TDs. This allows the TDRM 150 the full ability to manage memory as a resource without having any visibility into data resident in assigned TD memory.

MOT 160 (which may be referred to as TD-MOT) is a structure, such as a table, managed by the processor 112 to enforce assignment of physical memory pages to executing TDs, such as TD 190A. The MOT 160 structure is used to hold meta-data attributes for each 4 KB page of memory aligned with the TD 190A.).

In one implementation, the MOT 160 is aligned on a 4 KB boundary of memory and occupies a physically contiguous region of memory protected from access by software after platform initialization. In an implementation, the MOT 160 is a micro-architectural structure and cannot be directly accessed by software. Architecturally, the MOT 160 holds the following security attributes for each 4 KB page of host physical memory:

Page Status—Valid/Invalid bit (whether the page is valid memory or not)
Page Category—DRAM, NVRAM, IO, Reserved
Page State—(4 bit vector) specifies if the page is:
    bit 1—Free (a page that is not assigned to a TD and not used by the TDRM)
    bit 2—Assigned (a page assigned to a TD or TDRM)
    bit 3—Blocked (a page blocked as it is in the process of freeing/(re)assigning)
    bit 4—Pending (a dynamic page assigned to the TD but not yet accepted by TD)
TDID—(40 bit) TD Identifier that assigns the page to a specific unique TD. Address of the TDCS.

The meta-data for each 4 KB page of memory is directly indexed by a physical page address associated with the TD. A 4 KB page referenced in the MOT 160 can belong to one running instance of a TD 190A. The processor 112 uses the MOT 160 to enforce that the physical addresses referenced by software operating as a tenant TD 190A or the TDRM 150 cannot access memory not explicitly assigned to it. For example, the access control is enforced using the MOT 160 during the page walk for memory accesses made by software. Physical memory accesses performed by the processor 112 to memory that is not assigned to a tenant TD 190A or TDRM 150 fail with Abort page semantics. In some embodiments, the MOT 160 enforces the following properties. First, software outside a TD 190A should not be able to access (read/write/execute) in plain-text any memory belonging to a different TD (this includes TDRM 150). Second, memory pages assigned via the MOT 160 to specific TDs, such as TD 190A, should be accessible from any processor in the system (where the processor is executing the TD that the memory is assigned to).

In embodiments of the disclosure, the TDRM 150 acts as a host and has full control of the cores 120 and other platform hardware. A TDRM 150 assigns software in a TD 190A-190C with logical processor(s). The TDRM 150, however, cannot access a TD's 190A-190C execution state on the assigned logical processor(s). Similarly, a TDRM 150 assigns physical memory and I/O resources to the TDs 190A-190C, but is not privy to access the memory state of a TD 190A due to separate encryption keys, and other integrity and replay controls on memory.

With respect to the separate encryption keys, the processor 112 may utilize the MK-TME engine 145 to encrypt (and decrypt) memory used during execution. With total memory encryption (TME), any memory accesses by software executing on the core 120 can be encrypted in memory with an encryption key. MK-TME is an enhancement to TME that allows use of multiple encryption keys (the number of supported keys is implementation dependent). The processor 112 may utilize the MK-TME engine 145 to cause different pages to be encrypted using different MK-TME keys. The MK-TME engine 145 may be utilized in the TD architecture described herein to support one or more encryption keys per each TD 190A-190C to help achieve the cryptographic isolation between different CSP customer workloads. For example, when MK-TME engine 145 is used in the TD architecture, the CPU enforces by default that TD (all pages) are to be encrypted using a TD-specific encryption key.

Each TD 190A-190C may further choose specific TD memory pages to be plain text or encrypted. For example, the TD memory pages may be encrypted using a combination of keys (e.g., ephemeral keys that are generated for each execution of the TD) that are unknown to the TDRM 150, and a binding ("tweak") operation. The binding operation binds the TD memory pages to a particular TD by using a host physical address (HPA) of the page as a parameter to an encryption algorithm which is utilized to encrypt the TD memory page. So if the TD memory page is moved to another location (e.g., in main memory 114 or secondary storage 118), the page cannot be decrypted correctly even if the TD-specific encryption key is used.

The TDRM 150 on occasion may need to perform a memory paging operations to reclaim memory pages allocated to a first TD by storing contents of the pages to a disk (e.g., an external hard disk). The freed memory page can then be allocated to a second TD that is in need of extra memory. Embodiments of the disclosure provide techniques to support full memory paging between different TDs in compute system 200 without losing any of its security properties (e.g., tamper resistant/detection and confidentiality on a per TD basis). In one embodiment, processor 112 may implement a memory paging circuit 180. The memory paging circuit 180 allows the TDRM 150 to create a transportable page for a target TD memory page bound to a specific TD. This transportable page allows the TDRM 150 to page out the target TD memory page to use for another TD or a different location in memory.

In some implementations, the memory paging circuit 180 may be implemented as part of the TDRM 150. In alternative implementations, the memory paging circuit 180 may be implemented in a separate hardware component, circuitry, dedicated logic, programmable logic, and microcode of the processor 112 or any combination thereof. In one implementation, the memory paging circuit 180 may include a micro-architecture including processor logic and circuits similar to the processing cores 120. In some implementations, the memory paging circuit 180 may include a dedicated portion of the same processor logic and circuits used by the processing cores 120.

Figure 2:
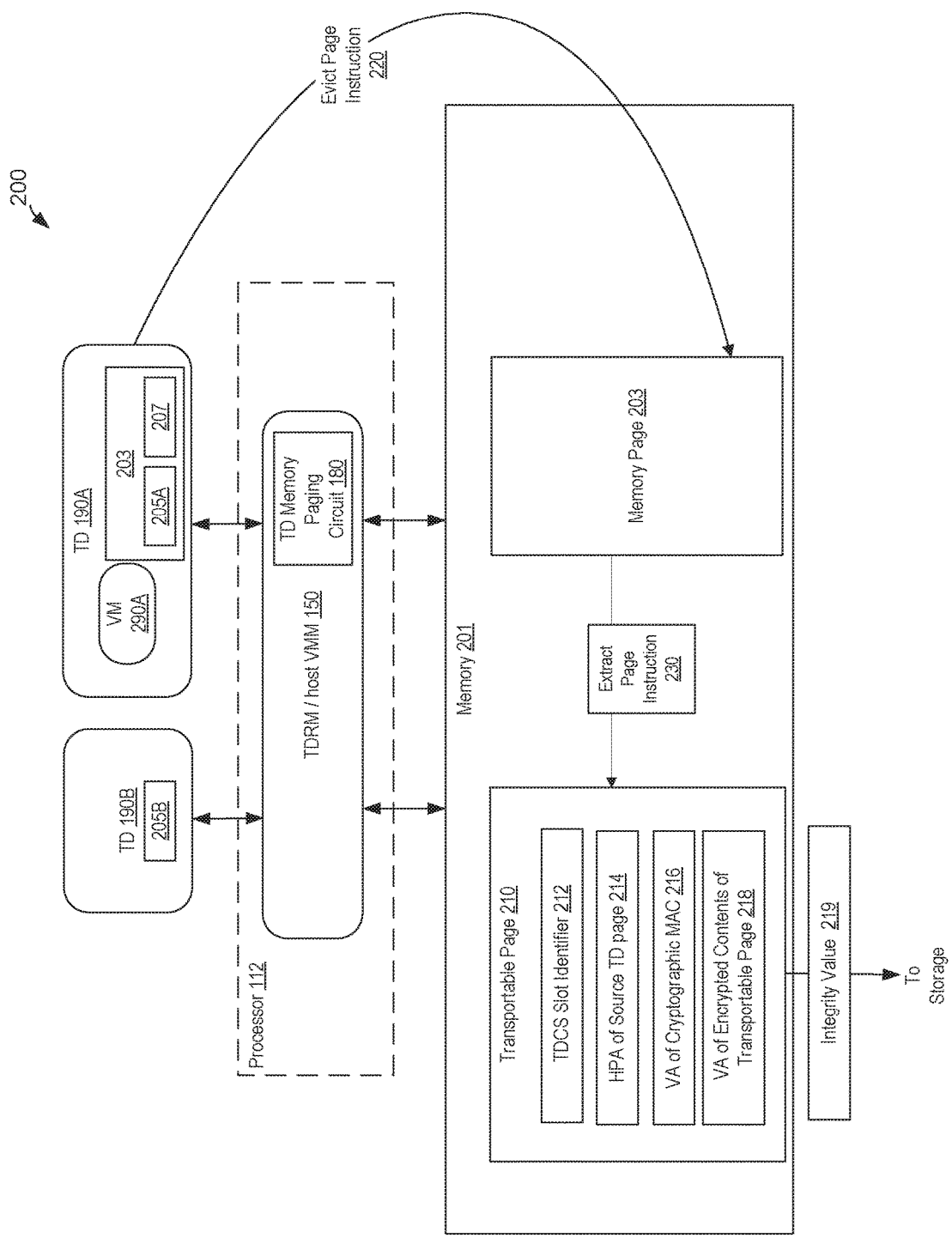
FIG. 2 illustrates a block diagram of an apparatus including a data structure to support memory paging in virtualized systems using trust domains according to one embodiment.

FIG. 2 illustrates a block diagram of an apparatus 200 including a data structure 201 according to one embodiment. In this example, apparatus 200 may be the same or similar to processing device 112. For example, apparatus 200 includes the memory paging circuit 180 of the TDRM 150 of FIG. 1, which implements processor instructions to support memory paging in virtualized systems using trust domains, such as TDs 190A and 190B. Each TD 190A and 190B is a software environment that can run VMMs, VMs, OSes, and/or applications. For example, TD 190A is depicted as hosting VM 290A. The apparatus 200 provides isolation between workloads executed by each of the TDs 190A and 190B.

In some embodiments, each TD is cryptographically isolated in memory using at least one exclusive encryption key of the MK-TME engine 145 for encrypting the memory (holding code and/or data) associated with the trust domain. For example, TD 190A may use encryption key 205A to encrypt TD memory page 203 of that TD, and TD 190B may use encryption key 205B to encrypt TD memory pages of TD 190D. Each TD may further choose specific TD memory pages to be plain text or encrypted using a combination of keys that are unknown to the TDRM 150 and a binding operation. For example, the binding operation binds the TD memory page 203 to TD 190A by using a host physical address (HPA) 207 of the page as a parameter to an encryption algorithm which is utilized to encrypt the TD memory page 203.

In some embodiments, the TDRM 150 may use the memory paging circuit 180 to page out a TD memory page 203 of TD 190A in order to provide memory to a different TD 190B. The TDRM 150 in accordance with the memory paging circuit 180 may execute an TD evict instruction 220 to evict the TD memory page 203 from the TD 190A. In some embodiments, the TD evict instruction 220 may only apply to certain memory pages of the TD 190A. For example, these memory pages may include pages with a GKID (e.g., Guest (TD) KeyID)=0 or DRAM pages, since the HKID (e.g., Host KeyID) is known to the TDRM 150. In some embodiments, the GKID are pages that are encrypted with TD's ephemeral key in which TDRM has the associated HKID and thus the encryption key pointer. When the TD evict instruction 220 is executed, the TDRM 150 marks in a paging table (not shown) that the TD memory page 203 is not available for TD 190A. For example, when the target TD memory page 210 is selected for eviction, the TDRM 150 marks the TD memory page 203 (e.g., in a paging table) as unavailable for the TD 190A. The TDRM 150 then flushes the page mappings of that page to the TD 190A, and any dirty cache lines for the page.

When TD evict instruction 220 is executed by the TDRM 150, a data structure 210 also referred to as a transportable page is created. The transportable page 210 allows the TDRM 150 to page out a TD memory page 203 in TD 190 for use for in TD 190B without losing any of the page's security properties. In some embodiments, the transportable page 210 may include encrypted content that has been extracted from the TD memory page 203. Once transportable page 210 is populated, the TDRM 150 copies the transportable page 210 to a secondary storage (e.g., file/disk). The TDRM 150 then invalidates cache lines for the old TD memory page 203 and makes the page available to a memory location associated with TD 190B. In some embodiments, rather than making the page immediately available, the TDRM 150 may store TD memory page 203 in a different location in memory 201. In such a case, the TDRM 150 may insert a TD memory page for a previously stored transportable page at the TD 190B.

To extract contents of the TD memory page 203 to the transportable page 210, the TDRM 150 in accordance with the memory paging circuit 180 may execute a TD extract instruction 230. The TD extract instruction 230 first removes the binding that binds the TD memory page 203 a specific (HPA) memory location 207 associated with TD 190A. To unbind the TD memory page 203 from the TD 190A, the TD extract instruction 230 may read the TD memory page 203 on behalf of the TD 190A. For example, the instruction may instruct the TD 190A to read the target TD memory page 203. This in turn decrypts the page within the TD by using the HPA address 207 of the page and the ephemeral keys of the TD 190A. In some embodiments, when a TD memory page 203 is read in accordance with TD extract instruction 230, the contents of a TD-assigned volatile memory page are extracted from a source memory address of the page to a destination address of the transportable page 210.

Once the binding of the TD memory page 203 to the TD 190A is removed, the TDRM 150 can use the TD extract instruction 230 to encrypt the transportable page 210 using the TD-specific encryption key 207A. In one embodiment, the encrypted the transportable page 210 may include, but not limited to, a TDCS slot identifier 212, a HPA of the source TD memory page 214, a virtual address (VA) of a region (e.g., 128 byte) of memory where a cryptographic MAS is captured for the page content and meta-data, and a VA of a (4 KB) page where the encrypted contents of the transportable page 210 are stored. The TDRM 150 may then instruct the apparatus 200 to transport the transportable page 210 to a different location in memory 201 or off to a storage device.

In some embodiments, the transportable page 210 may be saved with metadata that may include integrity value 219 for the page. For example, the integrity value 219 may be a cryptographic hash value that is generated based on the contents of the page and the TD-specific encryption key 207A. For example, the integrity value 219 can be generated using cryptographic hash algorithm, such as HMAC-SHA256, as the basis for data origin authentication and integrity verification. This integrity value 219 is used to verify that the transportable page 210 has not been tampered with on the storage device. For example, when the transportable page 210 is brought back to be inserted in memory 201, the TDRM 150 may check whether the integrity value 219 has changed in order to validate the contents of the transportable page 210.

Figure 3:
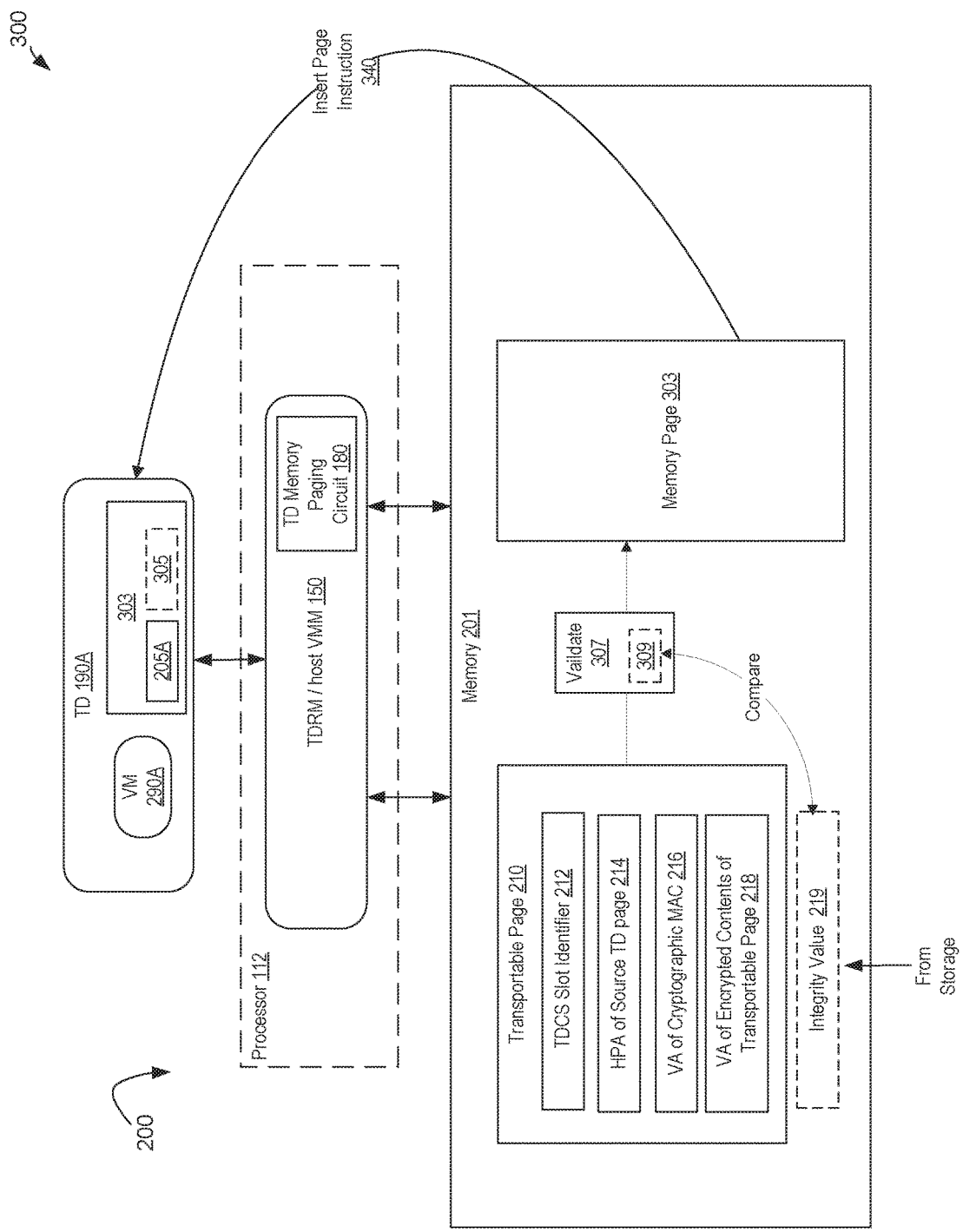
FIG. 3 illustrates is another view of the apparatus of FIG. 2 according to one embodiment.

FIG. 3 illustrates is another example 300 of the apparatus 200 of FIG. 2 according to one embodiment. In this example 330, the TDRM 150 may insert contents of the memory page that was paged out of TD 190A. For example, when an application (e.g., VM 290A) of TD 190A request access to the contents of the reclaimed memory pages, the TDRM 150 takes the memory pages from disk and provides then back to any location in memory 210 associated with the TD 190A. When the transportable page 210 is brought back to be inserted in memory, the TDRM 150 executes a TD insert page instruction 340.

The TD insert page instruction 340 first removes the encryption of the transportable page 210. For example, the encrypted contents of transportable page 218 are decrypted based on the TD specific encryption key 205A. In one embodiment, the instruction performs an integrity validation operation on the decrypted contents of the transportable page 201 to ensure that the page has not been changed. To validate the transportable page 210, the instruction compares the integrity value 219 of the transportable page 210 to the integrity value 309 stored in memory of the TDRM 150. If the integrity validation 207 fails because the integrity values 219 and 309 do not match, the instruction may return an error notification to the TDRM 150 of a memory mapping failure associated with the TD 190A. If the integrity values 219 and 309 match, this indicates that the transportable page 210 has not been modified.

On a successful integrity validation of the transportable page 210, the TDRM 150 then inserts the transportable page 210 at a HPA of a memory page 303 in memory 210. The TD insert page instruction 340 then instructs the TD 190A to bind the memory page 303 to TD 190A by using the ephemeral key associated with the TD 190A and specific HPA location 305. For example, the specific HPA 303 may be passed to the TD 190A via the TD insert page instruction 340. In some embodiments, the binding operation binds the memory page 303 back to TD 190A by using the HPA 305 as a parameter to an encryption algorithm which is utilized to encrypt the page 303. This binding allows the TD 190A to now correctly decrypt the content of the memory page 303, even though the page 303 may be at a different physical location from where it was paged out of the TD 190A assigned memory 201. As a result, the TD 190A may now correctly decrypt the contents of the TD memory page 303 because the encryption binds the page back to the TD 190A at the new memory location associated with the HPA 305.

Figure 4:
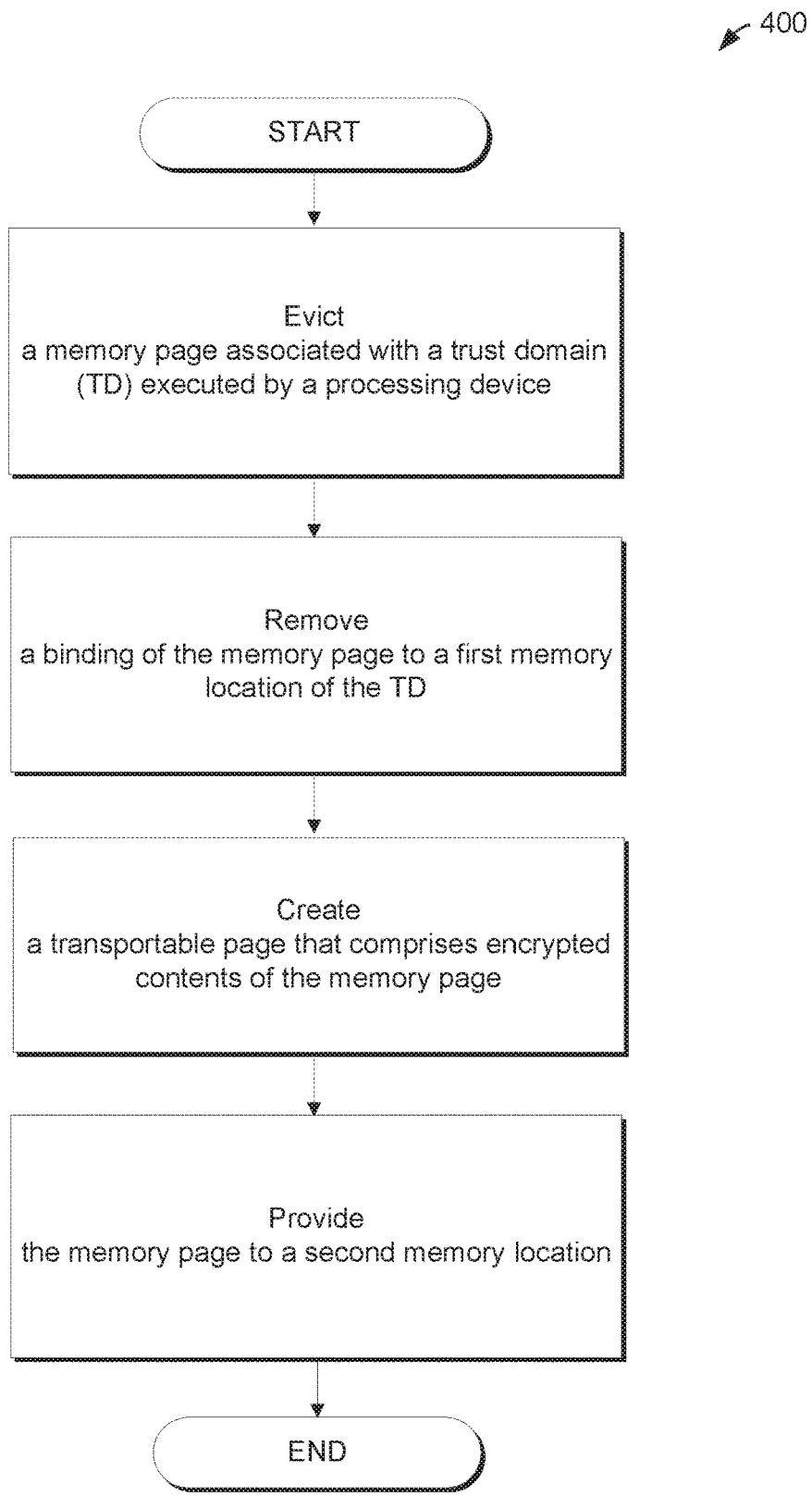
FIG. 4 illustrates a flow diagram of a method for supporting memory paging in virtualized systems using trust domains according to one embodiment.

FIG. 4 illustrates a flow diagram of a method 400 for supporting memory paging in virtualized systems using trust domains according to one embodiment. Method 400 may be performed by processing logic that may comprise hardware (e.g., circuitry, dedicated logic, programmable logic, microcode, etc.), software (such as instructions run on a processing device), firmware, or a combination thereof. In one embodiment, the memory paging circuit 180 of processing device 100 in FIG. 1 may perform method 400. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 400 begins at block 410 where a memory page 203 associated with a trust domain (TD) 190A executed by a processing device 112 is evicted. In block 420, a binding 205A of the memory page 203 to a first memory location 207 of the TD is removed. In block 430, a transportable page 210 that comprises encrypted contents 230 of the memory page 203 is created. Thereupon, the memory page 203 is provided to a second memory location 190B.

FIG. 5A is a block diagram illustrating a micro-architecture for a processor 500 that implements techniques for supporting memory paging in virtualized systems using trust domains functionality in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front-end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 550 may include for example a power management unit (PMU) 590 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 500 may be the same as processing device 100 described with respect to FIG. 1 to implement techniques for supporting memory paging in virtualized systems using trust domains with respect to implementations of the disclosure.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in the in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrate a register renaming, out-of-order issue/execution pipeline. In FIG. 5B, a processor pipeline 501 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
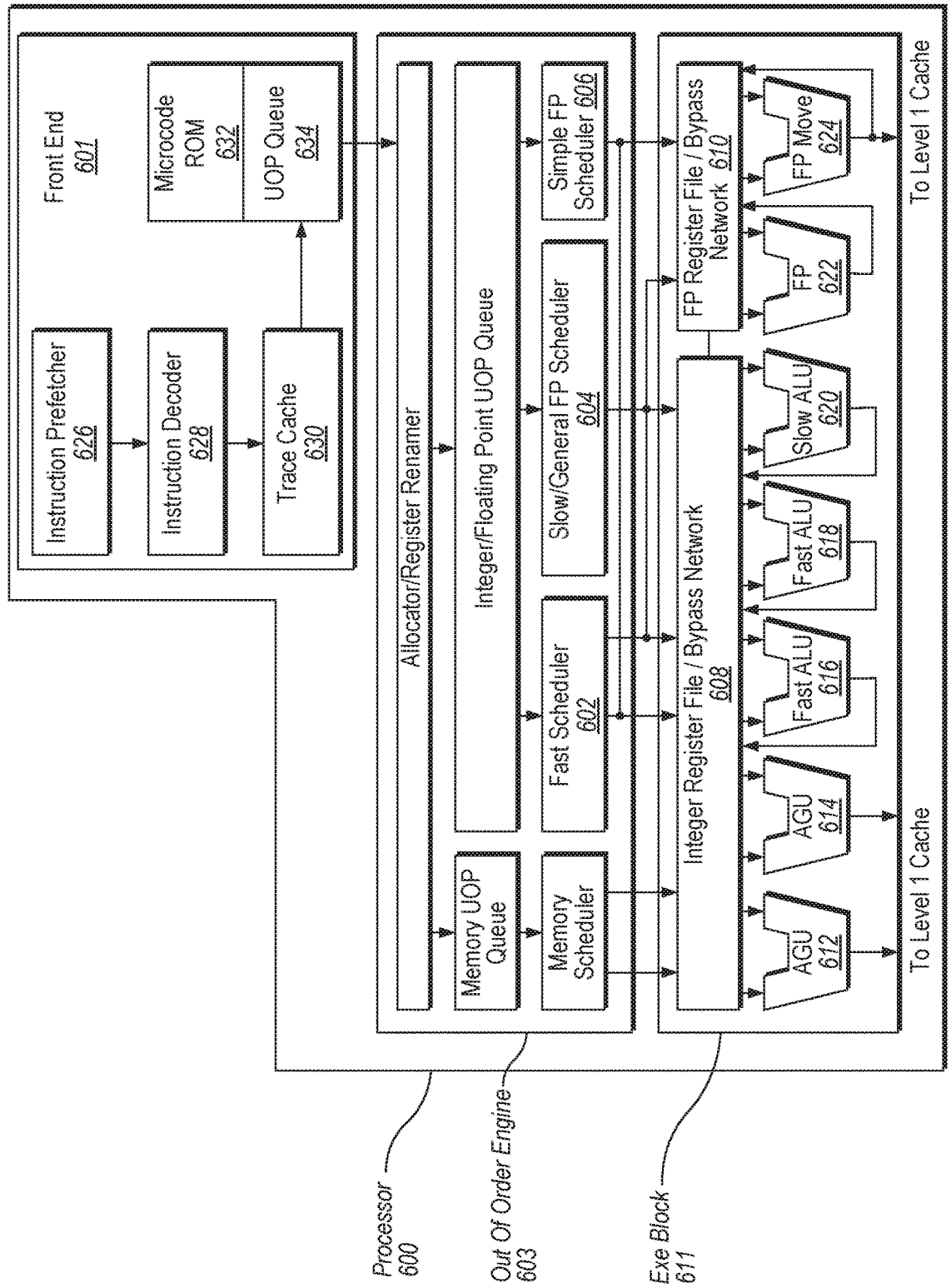
FIG. 6 is a block diagram illustrating a computer system according to one implementation.

FIG. 6 illustrates a block diagram of the micro-architecture for a processor 600 that includes logic circuits to implement techniques for supporting data compression using match-scoring functionality in accordance with one embodiment of the disclosure. In some embodiments, an instruction in accordance with one embodiment can be implemented to operate on data elements having sizes of byte, word, double word, quad word, etc., as well as data types, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628, which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct microinstruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610 sit between the schedulers 602, 604, 606, and the execution units 612, 614, 616, 618, 620, 622, 624 in the execution block 611. There is a separate register file 608, 610, for integer and floating-point operations, respectively. Each register file 608, 610, of one embodiment also includes a bypass network that can bypass or forward just completed results that have not yet been written into the register file to new dependent uops. The integer register file 608 and the floating-point register file 610 are also capable of communicating data with the other. For one embodiment, the integer register file 608 is split into two separate register files, one register file for the low order 32 bits of data and a second register file for the high order 32 bits of data. The floating-point register file 610 of one embodiment has 128 bit wide entries because floating-point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the microinstructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating-point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the disclosure, instructions involving a floating-point value may be handled with the floating-point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. The AGUs 612, 614, executes memory load/store operations. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating-point units 622, 624, can be implemented to support a range of operands having bits of various widths. For one embodiment, the floating-point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement memory paging in virtualized systems using trust domains according to embodiments of the disclosure. In one embodiment, the execution block 611 of processor 600 may include memory paging circuit 180 of FIG. 1, for implementing techniques for supporting memory paging in virtualized systems using trust domains functionality. In some embodiments, processor 600 may be the processing device 100 of FIG. 1.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32 bit integer data. A register file of one embodiment also may contain an eight multimedia SIMD register for packed data.

For the discussions below, the registers are understood to be data registers designed to hold packed data, such as 64 bits wide MMX™ registers (also referred to as 'mm' registers in some instances) in microprocessors enabled with MMX™ technology from Intel Corporation of Santa Clara, Calif. These MMX™ registers, available in both integer and floating point forms, can operate with packed data elements that accompany SIMD and SSE instructions. Similarly, 128 bits wide XMM™ registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
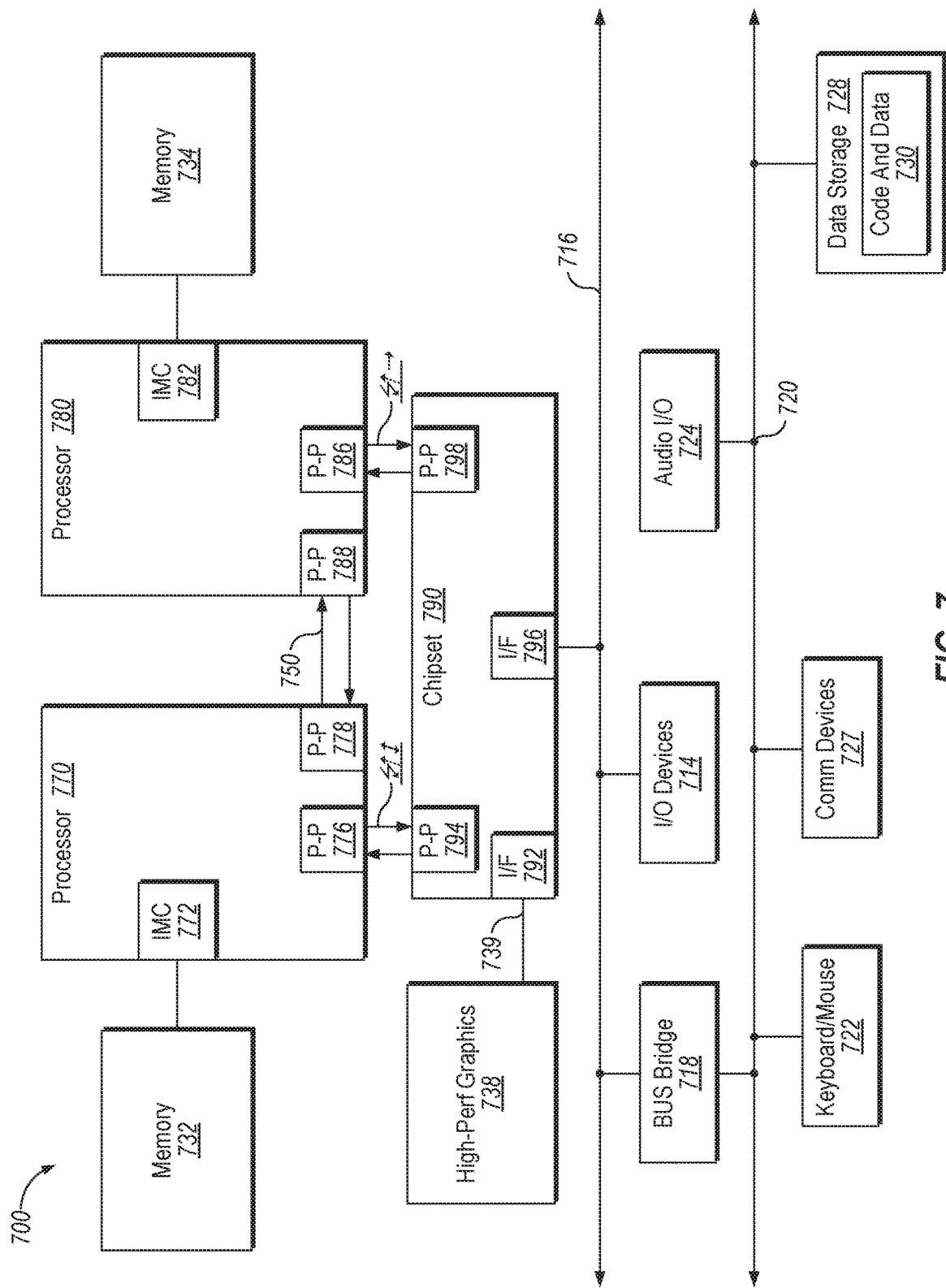
FIG. 7 is a block diagram illustrating a system in which an embodiment of the disclosure may be used.

Embodiments may be implemented in many different system types. Referring now to FIG. 7, shown is a block diagram illustrating a system 700 in which an embodiment of the disclosure may be used. As shown in FIG. 7, multi-processor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement techniques for supporting memory paging in virtualized systems using trust domains functionality as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
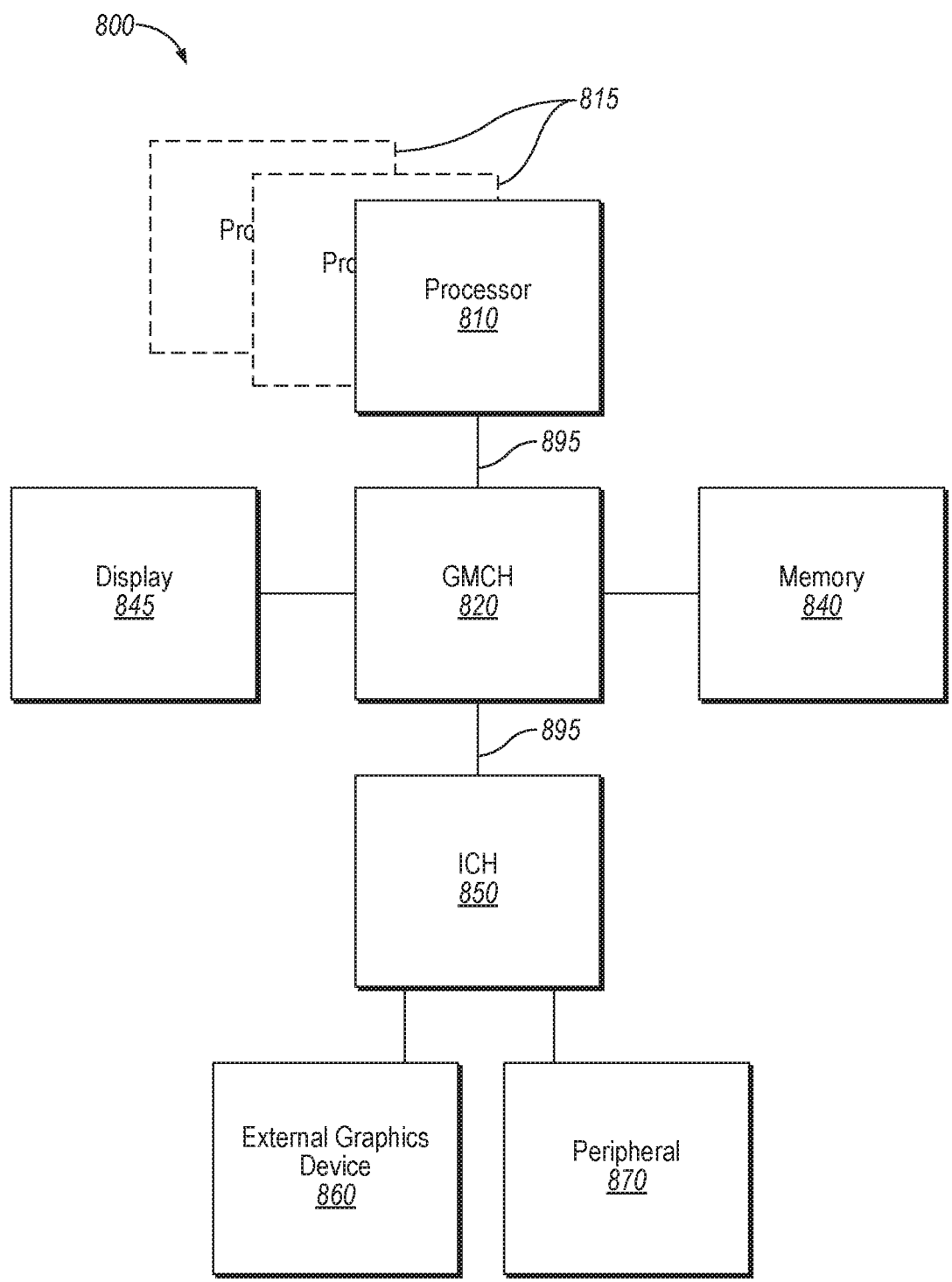
FIG. 8 is a block diagram illustrating a system in which an embodiment of the disclosure may be used.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement techniques for supporting memory paging in virtualized systems using trust domains functionality according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
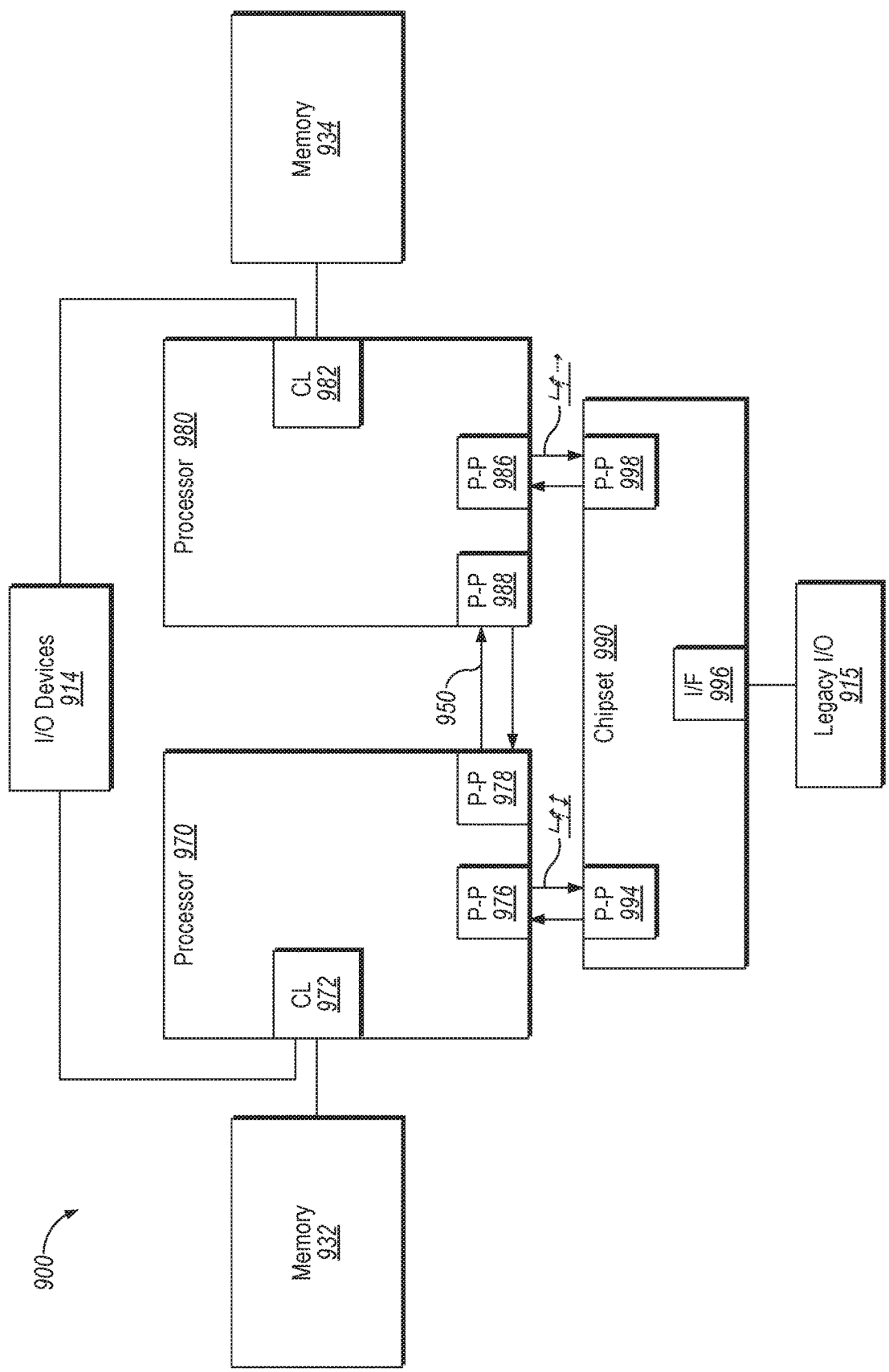
FIG. 9 is a block diagram illustrating a system in which an embodiment of the disclosure may be used.

Referring now to FIG. 9, shown is a block diagram of a system 900 in which an embodiment of the disclosure may operate. FIG. 9 illustrates processors 970, 980. In one embodiment, processors 970, 980 may techniques for supporting memory paging in virtualized systems using trust domains functionality as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
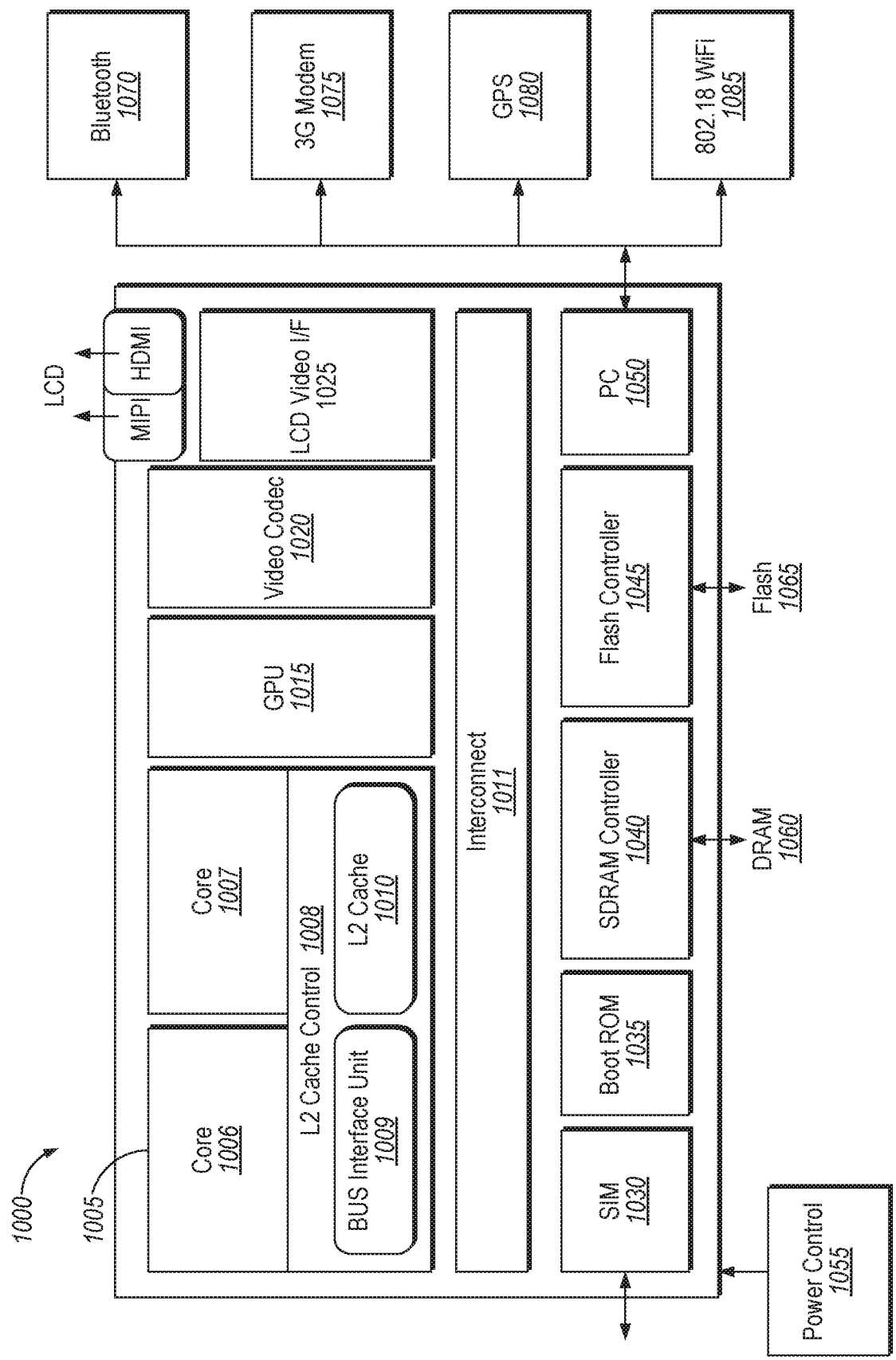
FIG. 10 is a block diagram illustrating a System-on-a-Chip (SoC) in which an embodiment of the disclosure may be used.

Embodiments may be implemented in many different system types. FIG. 10 is a block diagram of a SoC 1000 in accordance with an embodiment of the disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set of one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a PMU for implementing the memory paging circuit 180 as described in embodiments herein. In some embodiments, application processor 1020 may be the processing device 100 of FIG. 1.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogeneous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
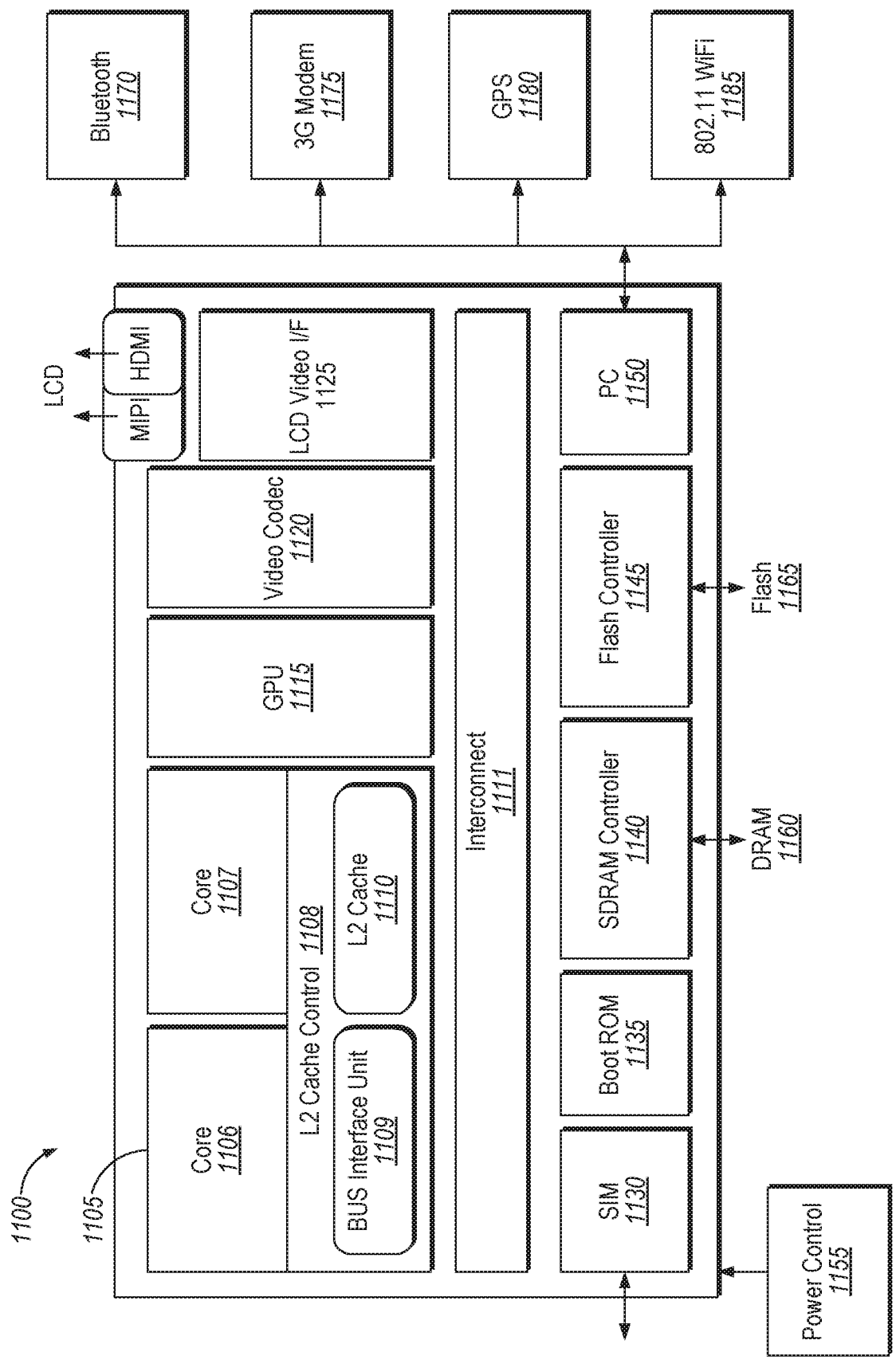
FIG. 11 is a block diagram illustrating a SoC design in which an embodiment of the disclosure may be used.

FIG. 11 is a block diagram of an embodiment of a system on-chip (SoC) design in accordance with the disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement techniques for supporting memory paging in virtualized systems using trust domains functionality as described in embodiments herein.

Interconnect 1110 provides communication channels to the other components, such as a Subscriber Identity Module (SIM) 1130 to interface with a SIM card, a boot ROM 1140 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
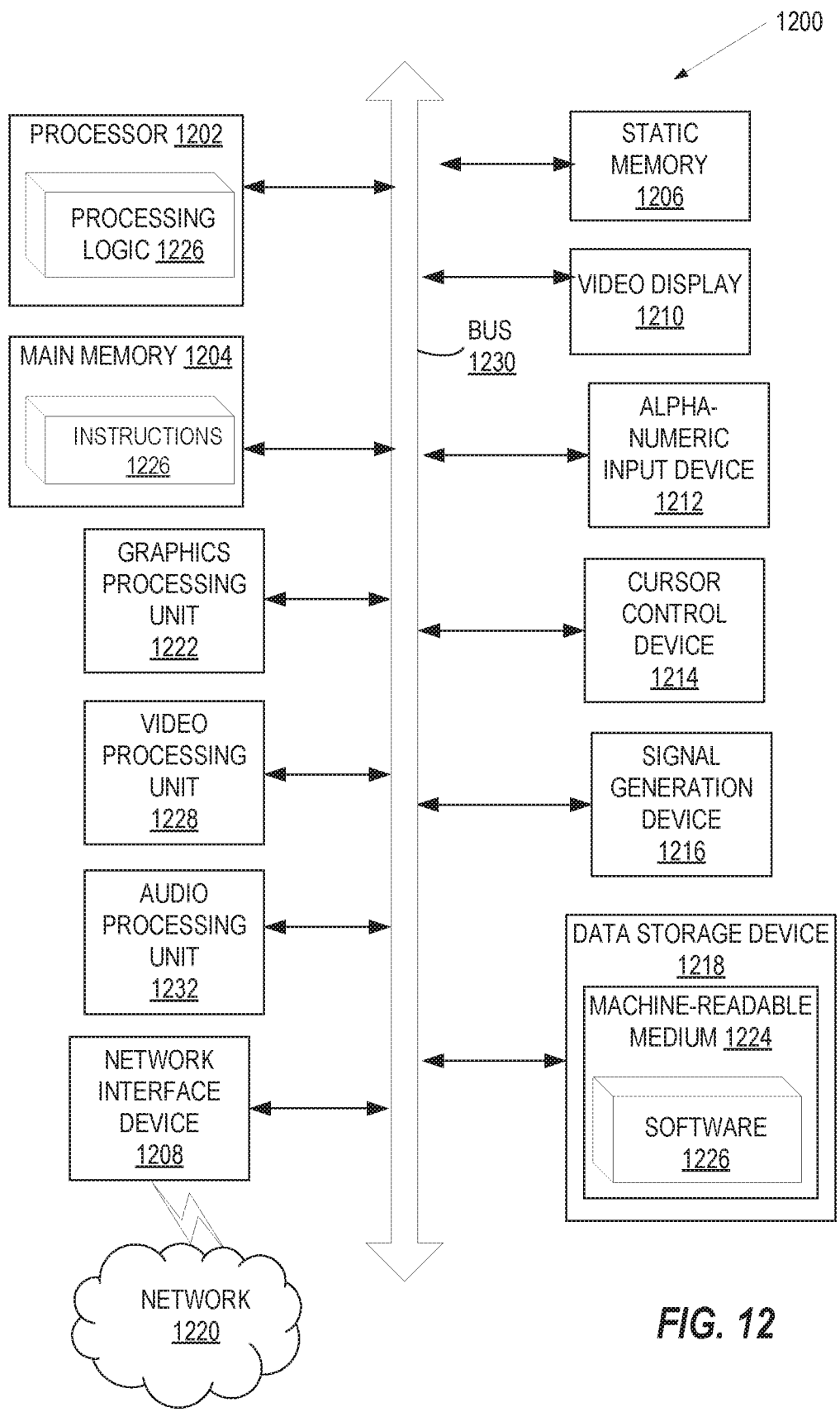
FIG. 12 illustrates a block diagram illustrating a computer system in which an embodiment of the disclosure may be used.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application-specific integrated circuit (ASIC), a field programmable gate array (FPGA), a digital signal processor (DSP), network processor, or the like. In one embodiment, processing device 1202 may include one or more processing cores. The processing device 1202 is configured to execute the processing logic 1226 for performing the operations and steps discussed herein. In one embodiment, processing device 1202 is the same as processor architecture 100 described with respect to FIG. 1 that implements techniques for supporting memory paging in virtualized systems using trust domains functionality as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a non-transitory machine-accessible storage medium 1224 on which is stored software 1226 implementing any one or more of the methodologies of functions described herein, such as implementing memory paging in virtualized systems using trust domains on threads in a processing device, such as processing device 100 of FIG. 1, as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The non-transitory machine-readable storage medium 1224 may also be used to store instructions 1226 implementing the memory paging circuit 180 on threads in a processing device such as described with respect to processing device 100 in FIG. 1, and/or a software library containing methods that call the above applications. While the non-transitory machine-accessible storage medium 1224 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 includes a processing device comprising: a memory controller; and a memory paging circuit, operatively coupled to the memory controller, to: evict a memory page associated with a trust domain (TD) executed by the processing device; remove a binding of the memory page to a first memory location of the TD; create a transportable page that comprises encrypted contents of the memory page; and provide the memory page to a second memory location.

Example 2 includes the processing device of example 1, wherein the TD is a cryptographically protected execution environment to execute applications.

Example 3 includes the processing device of example 1, wherein to remove the binding, the memory paging circuit is further to: decrypt contents of the memory page using a physical memory address associated with the TD.

Example 4 includes the processing device of example 1, wherein the memory paging circuit is further to: decrypt contents of the transportable page using a key associated with the TD; and verify the decrypted contents of the of the transportable page.

Example 5 includes the processing device of example 4, wherein to verify the decrypted contents, the memory paging circuit is further to: determine whether an integrity value stored in memory matches an integrity value derived from the transportable page.

Example 6 includes the processing device of example 4, wherein responsive to detecting that the decrypted contents are verified, the processing device is further to: insert the transportable page into a third memory location associated with the TD; and bind the transportable page to the TD by re-encrypting the transportable page based on the key associated with the TD and a physical address of the third memory location, wherein the physical address of third location is different from the physical address of the first location of the evicted memory page of the TD.

Example 7 includes the processing device of example 4, wherein responsive to detecting that the decrypted contents are not verified, the processing device is further to: generate an alert indicating a memory paging failure associated with the TD.

Example 8 includes a method comprising: evicting, by processing device, a memory page associated with a trust domain (TD) executed by the processing device; removing, by the processing device, a binding of the memory page to a first memory location of the TD; creating, by the processing device, a transportable page that comprises encrypted contents of the memory page; and providing, by the processing device, the memory page to a second memory location.

Example 9 includes the method of example 8, wherein the TD is a cryptographically protected execution environment to execute applications.

Example 10 includes the method of example 8, wherein removing the binding, further comprises: decrypting contents of the memory page using a physical memory address associated with the TD.

Example 11 includes the method of example 8, further comprising: decrypting contents of the transportable page using a key associated with the TD; and verifying decrypted contents of the transportable page.

Example 12 includes the method of example 11, wherein verifying the decrypted contents further comprises: determining whether an integrity value stored in memory matches an integrity value derived from the transportable page.

Example 13 includes the method of example 11, wherein responsive to detecting that the decrypted contents are verified: inserting the transportable page into a third memory location associated with the TD; and binding the transportable page to the TD by re-encrypting the transportable page based on the key associated with the TD and a physical address of the third memory location, wherein the physical address of third location is different from the physical address of the first location of the evicted memory page of the TD.

Example 14 includes the method of example 11, wherein responsive to detecting that the decrypted contents are not verified: generating an alert indicating a memory paging failure associated with the TD.

Example 15 include a system comprising: a memory to store trust domains; and a processing device, operatively coupled to the memory, to: evict a memory page associated with a trust domain (TD) executed by the processing device; remove a binding of the memory page to a first memory location of the TD; create a transportable page that comprises encrypted contents of the memory page; and provide the memory page to a second memory location.

Example 16 includes the system of example 15, wherein the TD is a cryptographically protected execution environment to execute applications.

Example 17 includes the system of example 15, wherein to remove the binding, the memory paging circuit is further to: decrypt contents of the memory page using a physical memory address associated with the TD.

Example 18 includes the system of example 15, wherein the memory paging circuit is further to: decrypt contents of the transportable page using a key associated with the TD; and verify the decrypted contents of the transportable page.

Example 19 includes the system of example 18, wherein to verify the decrypted contents, the memory paging circuit is further to: determine whether an integrity value stored in memory matches an integrity value derived from the transportable page.

Example 20 includes the system of example 18, wherein responsive to detecting that the decrypted contents are verified, the processing device is further to: insert the transportable page into a third memory location associated with the TD; and bind the transportable page to the TD by re-encrypting the transportable page based on the key associated with the TD and a physical address of the third memory location, wherein the physical address of third location is different from the physical address of the first location of the evicted memory page of the TD.

While the disclosure has been described respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, values or portions of values may represent states. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
a memory controller; and
a memory paging circuit, operatively coupled to the memory controller, to:
evict a memory page associated with a first trust domain (TD) to be executed by the processing device, wherein the first TD is cryptographically isolated in memory using at least one exclusive encryption key for encrypting the memory associated with the first TD;
create a transportable page that comprises encrypted contents of the memory page, wherein creating the transportable page comprises removing a binding that binds the memory page to a physical memory location associated with the first TD, and wherein the encrypted contents of the transportable page comprises at least one of a physical address of the memory page or a virtual address of a second memory page where the encrypted contents of the transportable page are stored;
decrypt contents of the transportable page using a key associated with the first TD; and
provide the transportable page to a second memory location of a second TD, wherein the providing comprises binding the transportable page to the second TD using an ephemeral key associated with the second TD and the second memory location.

2. The processing device of claim 1, wherein the first TD and the second TD are protected execution environments to execute applications.

3. The processing device of claim 1, wherein to remove the binding, the memory paging circuit is further to:
decrypt contents of the memory page using a physical memory address associated with the first TD.

4. The processing device of claim 1, wherein the memory paging circuit is further to:
decrypt contents of the transportable page using the key associated with the first TD; and
verify the decrypted contents of the transportable page.

5. The processing device of claim 4, wherein to verify the decrypted contents, the memory paging circuit is further to:
determine whether a first integrity value stored in memory matches a second integrity value derived from the transportable page.

6. The processing device of claim 4, wherein responsive to detecting that the decrypted contents are verified, the processing device is further to:
insert the transportable page into a third memory location associated with the first TD; and
bind the transportable page to the first TD by re-encrypting contents of the transportable page based on the key associated with the first TD and a physical address of the third memory location, wherein the physical address of the third location is different from the physical address of the first location of the evicted memory page of the first TD.

7. The processing device of claim 4, wherein responsive to detecting that the decrypted contents are not verified, the processing device is further to:
generate an alert indicating a memory paging failure associated with the first TD.

8. A method comprising:
evicting, by a processing device, a memory page associated with a trust domain (TD) executed by the processing device, wherein the TD is cryptographically isolated in memory using at least one exclusive encryption key for encrypting the memory associated with the TD;
creating, by the processing device, a transportable page that comprises encrypted contents of the memory page, wherein the creating comprises removing a binding that binds the memory page to a physical memory location associated with the TD, and wherein the encrypted contents of the transportable page comprises at least one of a physical address of the memory page or a virtual address of a second memory page where the encrypted contents of the transportable page are stored;
decrypting contents of the transportable page using a key associated with the TD; and
providing, by the processing device, the transportable page to a second memory location of a second TD, wherein the providing comprises binding the transportable page to the second TD using an ephemeral key associated with the second TD and the second memory location.

9. The method of claim 8, wherein the TD and the second TD are cryptographically protected execution environments to execute applications.

10. The method of claim 8, wherein removing the binding, further comprises:

decrypting contents of the memory page using a physical memory address associated with the TD.

11. The method of claim 8, further comprising:
decrypting contents of the transportable page using the key associated with the TD; and
verifying decrypted contents of the transportable page.

12. The method of claim 11, wherein verifying the decrypted contents further comprises:
determining whether a first integrity value stored in memory matches a second integrity value derived from the transportable page.

13. The method of claim 11, wherein responsive to detecting that the decrypted contents are verified:
inserting the transportable page into a third memory location associated with the TD; and
binding the transportable page to the TD by re-encrypting the contents of transportable page based on the key associated with the TD and a physical address of the third memory location, wherein the physical address of the third location is different from the physical address of the first location of the evicted memory page of the TD.

14. The method of claim 11, wherein responsive to detecting that the decrypted contents are not verified:
generating an alert indicating a memory paging failure associated with the TD.

15. A system comprising:
a memory to store trust domains; and
a processing device, operatively coupled to the memory, to:
evict a memory page associated with a trust domain (TD) to be executed by the processing device, wherein the TD is cryptographically isolated in memory using at least one exclusive encryption key for encrypting the memory associated with the TD;
create a transportable page that comprises encrypted contents of the memory page, wherein the creating comprises removing a binding that binds the memory page to a physical memory location associated with the TD, and wherein the encrypted contents of the transportable page comprises at least one of a physical address of the memory page or a virtual address of a second memory page where the encrypted contents of the transportable page are stored;
decrypt contents of the transportable page using a key associated with the TD; and
provide the transportable page to a second memory location of a second TD, wherein the providing comprises binding the transportable page to the second TD using an ephemeral key associated with the second TD and the second memory location.

16. The system of claim 15, wherein the TD and the second TD are cryptographically protected execution environments to execute applications.

17. The system of claim 15, wherein to remove the binding, the processing device is further to:
decrypt contents of the memory page using a physical memory address associated with the TD.

18. The system of claim 15, wherein the processing device is further to:
decrypt contents of the transportable page using the key associated with the TD; and
verify the decrypted contents of the transportable page.

19. The system of claim 18, wherein to verify the decrypted contents, the processing device is further to:
determine whether a first integrity value stored in memory matches a second integrity value derived from the transportable page.

20. The system of claim 18, wherein responsive to detecting that the decrypted contents are verified, the processing device is further to:
insert the transportable page into a third memory location associated with the TD; and
bind the transportable page to the TD by re-encrypting contents of the transportable page based on the key associated with the TD and a physical address of the third memory location, wherein the physical address of the third location is different from the physical address of the first location of the evicted memory page of the TD.

* * * * *